United States Patent
Rachui et al.

(10) Patent No.: US 10,444,039 B2
(45) Date of Patent: Oct. 15, 2019

(54) MAGNET UNIT FOR A SENSOR DEVICE FOR DETECTING A MEASUREMENT VARIABLE WHICH IS CHARACTERISTIC OF A STATE OF ROTATION OF A STEERING SHAFT OF A MOTOR VEHICLE

(71) Applicant: VALEO Schalter und Sensoren GmbH, Bietigheim-Bissingen (DE)

(72) Inventors: Dirk Rachui, Bietigheim-Bissingen (DE); Jens Thom, Boeblingen (DE); Ekkehart Froehlich, Nordheim (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 436 days.

(21) Appl. No.: 15/022,409

(22) PCT Filed: Aug. 11, 2014

(86) PCT No.: PCT/EP2014/067178
§ 371 (c)(1),
(2) Date: Mar. 16, 2016

(87) PCT Pub. No.: WO2015/039809
PCT Pub. Date: Mar. 26, 2015

(65) Prior Publication Data
US 2016/0223361 A1    Aug. 4, 2016

(30) Foreign Application Priority Data

Sep. 18, 2013   (DE) .................. 10 2013 015 452

(51) Int. Cl.
*G01L 3/10* (2006.01)
*G01D 5/244* (2006.01)
(Continued)

(52) U.S. Cl.
CPC .......... *G01D 5/24442* (2013.01); *G01L 3/104* (2013.01); *G01L 5/221* (2013.01);
(Continued)

(58) Field of Classification Search
CPC .. G01D 5/24442; G01D 5/145; G01D 11/245; G01L 3/104; G01L 5/221; G01P 3/487
(Continued)

(56) References Cited

U.S. PATENT DOCUMENTS 6,198,372 B1    3/2001   Schwarz
6,259,343 B1 *  7/2001   Schwarz ............... H01F 7/0215
                                                         335/302
(Continued)

FOREIGN PATENT DOCUMENTS

DE    198 36 451 A1    2/2000
DE    102 40 049 A1    4/2003
(Continued)

OTHER PUBLICATIONS

Notification of Reasons for Refusal issued in corresponding Japanese Application No. 2016-543342, dated Jun. 6, 2017 (6 pages).
(Continued)

*Primary Examiner* — Octavia Hollington
(74) *Attorney, Agent, or Firm* — Osha Liang LLP

(57) ABSTRACT

A method for producing a magnet unit for a sensor device for detecting a measurement variable which is characteristic of a state of rotation of a steering shaft of a motor vehicle provides a ring-shaped magnet element composed of a plastics-bonded magnet material and a carrier sleeve for the connection of the magnet unit to a shaft part of the steering shaft and connects the magnet element to the carrier sleeve, in particular axially adjacent to one another by way of respective axial face sides. A plastics element is provided on the carrier sleeve, and the connecting includes the plastics (Continued)

element and the magnet element being cohesively connected to one another.

9 Claims, 2 Drawing Sheets

(51) Int. Cl.
| | |
|---|---|
| *G01P 3/487* | (2006.01) |
| *G01L 5/22* | (2006.01) |
| *G01D 5/14* | (2006.01) |
| *G01D 11/24* | (2006.01) |

(52) U.S. Cl.
CPC .............. *G01P 3/487* (2013.01); *G01D 5/145* (2013.01); *G01D 11/245* (2013.01)

(58) Field of Classification Search
USPC ........................ 73/862.335, 862.331–862.338
See application file for complete search history.

(56) References Cited

U.S. PATENT DOCUMENTS

| | | | | |
|---|---|---|---|---|
| 6,967,047 | B2* | 11/2005 | Heinrich | H01F 7/0252 |
| | | | | 277/317 |
| 7,847,446 | B2* | 12/2010 | Becker | F16D 1/0835 |
| | | | | 310/68 B |
| 7,918,962 | B2 | 4/2011 | Okui et al. | |
| 8,188,820 | B2* | 5/2012 | Branchereau | G01D 5/145 |
| | | | | 335/209 |
| 8,717,011 | B2* | 5/2014 | Henning | G01D 5/145 |
| | | | | 324/207.25 |
| 9,255,783 | B2* | 2/2016 | Ludwig | G01B 7/30 |
| 9,518,880 | B2* | 12/2016 | Schoepe | G01L 3/104 |
| 2001/0020882 | A1 | 9/2001 | Heinrich | |
| 2003/0102946 | A1 | 6/2003 | Haussecker et al. | |
| 2004/0194560 | A1 | 10/2004 | Froehlich et al. | |
| 2007/0139035 | A1* | 6/2007 | Ishii | F16J 15/3456 |
| | | | | 324/174 |
| 2007/0209438 | A1 | 9/2007 | Branchereau | |
| 2017/0328737 | A1* | 11/2017 | Sen | G01D 5/145 |

FOREIGN PATENT DOCUMENTS

| | | | | |
|---|---|---|---|---|
| DE | 10 2005 055 949 A1 | 5/2007 | | |
| DE | 10 2007 043 502 A1 | 4/2009 | | |
| DE | 10 2007 050 258 A1 | 4/2009 | | |
| DE | 10 2008 011 448 A1 | 9/2009 | | |
| DE | 10 2008 014 985 A1 | 9/2009 | | |
| DE | 10 2008 047 466 A1 | 4/2010 | | |
| DE | 10 2011 118 642 A1 | 5/2013 | | |
| DE | 10201118642 | * | 5/2013 | .............. G01B 7/30 |
| EP | 1 123 794 A2 | 8/2001 | | |
| EP | 1 798 558 A1 | 6/2007 | | |
| EP | 1 965 090 A2 | 9/2008 | | |
| EP | 2 433 848 A2 | 3/2012 | | |
| EP | 2 594 915 A2 | 5/2013 | | |
| JP | H07167674 A | 7/1995 | | |
| JP | 2001050969 A | 2/2001 | | |
| WO | 2009/035266 A2 | 3/2009 | | |

OTHER PUBLICATIONS

International Search Report issued in PCT/EP2014/067178 dated Oct. 23, 2014 (2 pages).
Written Opinion of the International Searching Authority issued in PCT/EP2014/067178 dated Oct. 23, 2014 (5 pages).
German Search Report issued in Patent application No. 10 2013 015 452.9 dated May 15, 2014 (7 pages).

* cited by examiner

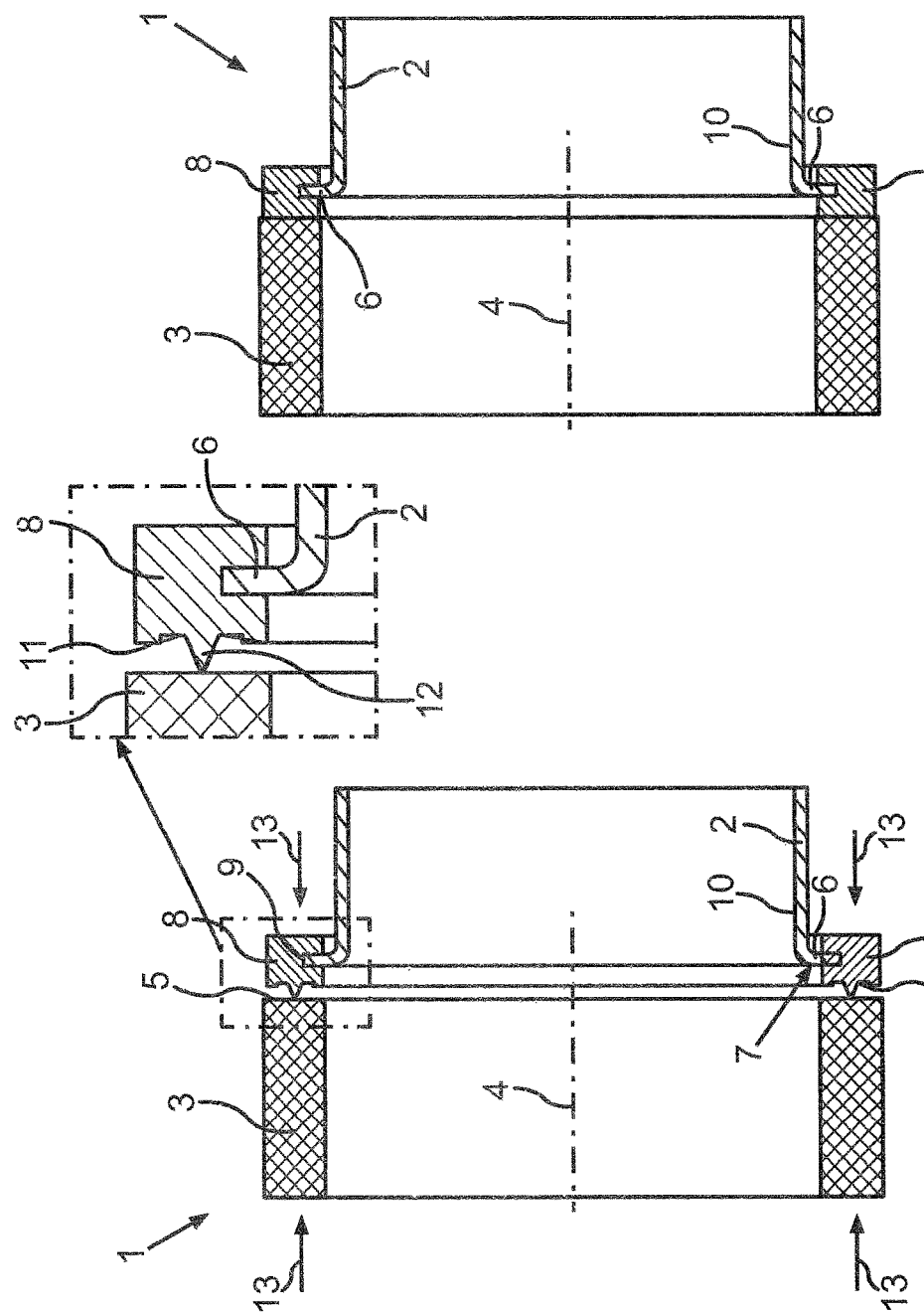

MAGNET UNIT FOR A SENSOR DEVICE FOR DETECTING A MEASUREMENT VARIABLE WHICH IS CHARACTERISTIC OF A STATE OF ROTATION OF A STEERING SHAFT OF A MOTOR VEHICLE

BACKGROUND

The invention relates to a method for producing a magnet unit for a sensor device for detecting a measurement variable which is characteristic of a state of rotation of a steering shaft of a motor vehicle. A ring-shaped magnet element composed of a plastics-bonded magnet material is provided. Furthermore, a carrier sleeve—composed for example of metal—is provided, by way of which the magnet unit can be connected to a shaft part of the steering shaft. The magnet element and the carrier sleeve are then, in particular axially adjacent to one another, connected to one another by way of respective axial face sides. The invention also relates to a magnet unit for a sensor device of a motor vehicle, having a ring-shaped magnet element and having a carrier sleeve which is connected to the magnet element and by way of which the magnet unit can be connected to a shaft part. The invention also relates to a sensor device and to a motor vehicle.

Torque sensor devices for detecting a torque applied to a steering shaft of a motor vehicle are already prior art. Such torque sensor devices may be used for example in electric steering systems. A torque sensor device of said type is known for example from the document US 2004/0194560 A1 and from the document DE 102 40 049 A1. Here, the torque sensor device is attached to two shaft parts or sub-shafts of the steering shaft which are situated opposite one another in an axial direction. A magnet—for example a ring-shaped magnet—is arranged on the first shaft part, whereas a holder with a magnetic stator is attached to the other shaft part, which stator is situated opposite the permanent magnet in a radial direction with a small air gap. Via the stator—which is normally composed of two separate stator parts—the magnetic flux of the magnet is conducted to a first and to a second flux conductor, which then release the magnetic flux to a magnetic sensor—for example a Hall sensor.

A torque sensor device of said type is also known from document DE 10 2007 043 502 A1.

Furthermore, from the prior art, steering angle sensor devices are also known which serve for the detection of the present steering angle of the steering shaft. A device of said type emerges, so as to be known, for example from the document DE 10 2008 011 448 A1. A rotational movement of the steering shaft is in this case transmitted via a gearing to a relatively small gearwheel, which bears a magnet. The rotation of the relatively small gearwheel is then detected by way of a magnetic sensor.

The prior art also includes devices in which the torque sensor device, on the one hand, and the steering angle sensor device, on the other hand, are formed integrally as a common unit.

SUMMARY

In the present case, the focus of interest is on a magnet unit of a torque sensor device or of a combined torque and steering angle sensor device. A magnet unit of said type is normally composed of the stated magnet element, which is in the form of a permanent magnet, and of a metallic sleeve, by way of which the magnet unit is connected to the associated shaft part of the steering shaft. Thus, while the sleeve is formed from metal, the magnet element is generally provided so as to be composed of a plastic filled with magnetic particles, which is relatively brittle owing to the high degree of filling. The sleeve may be fastened to the associated shaft part for example by way of adhesive bonding, welding, caulking or pressing.

A particular challenge lies in providing a reliable connection between the magnet element, on the one hand, and the sleeve, on the other hand. In the case of the magnet element being directly injection-moulded onto the sleeve, it is specifically the case that, during the cooling of the plastics melt, shrinkage stresses arise which, in particular in conjunction with the different coefficients of thermal expansion of the sleeve and of the magnet element, can lead to the formation of cracks in the magnet element in the presence of the temperature differences that arise during operation. For this reason, in document EP 1 123 794 A1, it is proposed that the magnet element be fastened to the sleeve not directly but via an intermediate element composed of an elastic material. In other words, the connection between the magnet element and the metal sleeve is produced by way of an elastic intermediate plastic in an additional injection moulding encapsulation process. This solution has however proven to be relatively disadvantageous because the highly cumbersome positive locking of the parts to be connected, and the sealing surfaces required for the injection moulding encapsulation process, restrict the generally desired different diameters of the sleeve and of the magnet element and thus the corresponding structural space. Furthermore, the proposed solution is relatively cumbersome and expensive.

A further solution regarding how the sleeve can be connected to the magnet element is described in DE 198 36 451 C2. Here, the sleeve is encapsulated with the plastics-bonded magnet material by injection moulding, wherein the sleeve has a tab-like part which is surrounded by the highly filled plastic and arranged in the highly filled plastic so as to accommodate shrinkage stresses of the plastic. Here, the connection of the sleeve to the magnet element is thus performed in an injection moulding process, whereby it is again possible for shrinkage stresses to be generated.

A magnet assembly having a magnet ring which is attached by way of a carrier sleeve to a shaft is furthermore known from document DE 10 2008 047 466 A1. Here, the magnet ring lies radially above the carrier sleeve and is additionally connected to the carrier sleeve by way of at least one intermediate piece.

Magnet assemblies are furthermore known from the documents DE 10 2007 050 258 A1 and DE 10 2008 014 985 A1.

In the present case, the magnet assembly is in particular one in which the magnet element, on the one hand, and the carrier sleeve, on the other hand, are positioned axially adjacent to one another and thus not radially one above the other, and are connected to one another by way of respective axial face sides. Such a type of construction of the magnet unit is required in the case of some types of torque sensors owing to the available structural space. Such an arrangement of the magnet element, on the one hand, and of the carrier sleeve, on the other hand, axially adjacent to one another is already known from the document EP 1 123 794 B1 as cited above. As already stated, said solution has however proven to be relatively disadvantageous because the highly cumbersome positive locking and the sealing surfaces required for the injection moulding encapsulation process restrict the generally required different diameters of the sleeve and of the magnet element and thus the corresponding structural space. In particular in the case of particularly restricted structural space conditions, it may also be impossible for the surfaces required for a sealing action during the injection moulding encapsulation process to be formed on the component or in the tool.

It is an object of the invention to specify a solution regarding how, in the case of a method of the generic type mentioned in the introduction, the carrier sleeve and the magnet element can be connected to one another without great connection outlay and in a particularly reliable manner.

Said object is achieved according to the invention by way of a method, by way of a magnet unit, by way of a sensor device and by way of a motor vehicle having the features as per the respective independent patent claims. Advantageous embodiments of the invention are specified in the dependent patent claims, in the description and in the figures.

In the case of a method according to the invention, a magnet unit is produced which is designed specifically for a sensor device which serves for detecting a measurement variable which is characteristic of a state of rotation of a steering shaft of a motor vehicle, in particular a torque and/or a steering angle. A ring-shaped magnet element composed of a plastics-bonded magnet material and a carrier sleeve—composed for example of metal—are provided. The bead-like sleeve serves for the connection of the magnet unit to an associated shaft part of the steering shaft. After the provision of the magnet element and of the carrier sleeve, said components are connected to one another—in particular axially adjacent to one another by way of respective axial face sides. The sleeve, on the one hand, and the magnet, on the other hand, are then preferably arranged axially adjacent to one another. It is provided according to the invention that a plastics element is provided on the carrier sleeve—in particular on the axial face side of the carrier sleeve—and that the connecting of the magnet element to the carrier sleeve comprises the plastics element and the plastics-bonded magnet material of the magnet element being cohesively connected to one another. It is preferable for the axial face side of the plastics element, on the one hand, and the axial face side of the magnet element to be cohesively connected to one another.

According to the invention, a plastics element composed of plastic is fastened to the carrier sleeve, in particular to the axial face side of the sleeve, which plastics element is subsequently connected by way of cohesion to the magnet element, in particular to the face side of the magnet element. This reduces the production outlay in relation to the prior art, because a positively locking connection between the plastics element and the magnet element, such as is proposed in EP 1 123 794 B1, is made superfluous. Specifically, the plastics element does not need to be embedded into a corresponding groove or opening of the magnet element. Instead, a cohesive connection is proposed which can be produced with reduced outlay in relation to the positively locking connection according to the prior art. Optionally, the connection between the magnet element and the plastics element may also be realized in exclusively cohesive fashion.

In principle, the cohesive connection may be realized by way of adhesive bonding of the magnet element to the plastics element. Since it is however the case here that the adhesive must be dosed as a further component and then cured, it is proposed in one embodiment that the cohesive connection is performed by welding, in particular laser welding and/or ultrasound welding. In this way, the production process can be automated without great outlay, and there is no need to subsequently wait for a curing time to elapse. Thus, there is also no need for adhesive to be dosed in a laborious manner, which additionally further reduces the outlay for the production process. Furthermore, by way of the laser welding and/or ultrasound welding, it is possible for a particularly reliable and robust connection to be produced between the magnet element and the plastics element. A great advantage of these two welding methods is also the relatively low input of energy into the two components, which in turn results in less thermal distortion. Furthermore, the process technologies of laser welding and ultrasound welding are industrially available, such that, using these two methods, the plastics parts on both sides can be fixedly connected to one another without great outlay.

The plastics materials of the magnet element and of the plastics element are preferably thermoplastics or plastomers, which, in a predefined temperature range, are capable of being deformed, wherein said process is reversible.

On the axial face side of the plastics element and/or of the magnet element there is preferably formed an axial stud by way of which the cohesive connection is performed. Such a stud or rib then constitutes an energy concentrator for the connection process, thus facilitating, in particular, the welding process. The stud is particularly advantageous in particular for an ultrasound welding process.

If ultrasound welding is performed, the magnet element and the plastics element melt at the contact surface owing to the axial pressure, and thereby connect to one another.

By contrast, if laser welding is used, the two parts for connection do not move relative to one another during the joining process, such that precise positioning is possible.

In general, for improved positioning of the magnet element and of the plastics element relative to one another, centring structures may be formed on the face side of the magnet element and/or of the plastics element, which centring structures are in particular independent of the joining surfaces. Such centring structures may for example be a step by way of which the magnet element and the plastics element can be held securely relative to one another in the assembly position. Other centring aids are however also possible, for example in the form of a pin, on the one hand, and a corresponding bore, on the other hand.

For the laser welding in particular, it has proven to be advantageous for the plastics element to be provided so as to be composed of a transparent plastics material. A laser beam can then be directed onto the contact surface through the plastics element, thus heating the light-absorbing magnet material of the magnet element to the point of melting. The plastics material of the plastics element likewise melts slightly, and a cohesive connection is formed.

The plastics material of the plastics element may for example be injection-moulded onto the axial face side of the carrier sleeve. Here, the carrier sleeve may have an encircling flange onto which the plastics material of the plastics element is injection moulded. A positively locking connection is thus formed between the plastics element, on the one hand, and the carrier sleeve, on the other hand.

It has proven to be particularly advantageous if, during the connection of the plastics element to the carrier sleeve, positive locking with rotationally conjoining action is produced between the plastics element and the carrier sleeve. By way of such positive locking, it is possible for relative movements or a relative rotation of the carrier sleeve relative to the plastics element to be prevented.

The positive locking with rotationally conjoining action may be realized for example by virtue of openings being formed in the carrier sleeve, into which openings the plastics material of the plastics element extends. Such openings may be provided for example in said flange of the carrier sleeve, such that the plastic of the plastics element projects axially through said openings.

In addition or alternatively, the positive locking with rotationally conjoining action may be produced by way of an undulating and/or toothed outer edge of the carrier sleeve, in particular of said flange. This embodiment, too, ensures reliable prevention of relative rotation.

The invention also relates to a magnet unit for a sensor device, having a ring-shaped magnet element composed of a plastics-bonded magnet material, and having a carrier sleeve which is connected to the magnet element and by way of which the magnet unit can be connected to a shaft part. The magnet element and the carrier sleeve are in particular arranged axially adjacent to one another and connected to one another by way of respective axial face sides. On the carrier sleeve, in particular on the axial face side of the carrier sleeve, there is arranged a plastics element which is cohesively connected to the magnet element, in particular to the axial face side of the magnet element.

A sensor device according to the invention is designed for detecting a measurement variable which is characteristic of a state of rotation of a steering shaft of a motor vehicle, and comprises a magnet unit according to the invention.

A motor vehicle according to the invention, in particular a passenger motor vehicle, comprises a sensor device according to the invention.

The preferred embodiments presented with reference to the method according to the invention, and the advantages thereof, apply correspondingly to the magnet unit according to the invention, to the sensor device according to the invention and to the motor vehicle according to the invention.

Further features of the invention will emerge from the claims, from the figures and from the description of the figures. All of the features and feature combinations mentioned above in the description, and the features and feature combinations mentioned below in the description of the figures and/or shown individually in the figures, may be used not only in the respectively specified combination but also in other combinations or individually.

BRIEF DESCRIPTION OF THE DRAWINGS

The invention will now be discussed in more detail on the basis of a preferred exemplary embodiment and with reference to the appended drawings, in which:

FIGS. 1 and 2 show, in a schematic illustration, a sectional view through a magnet unit as per one embodiment of the invention, wherein an ultrasound welding process will be discussed in more detail;

DETAILED DESCRIPTION

Figure 4:
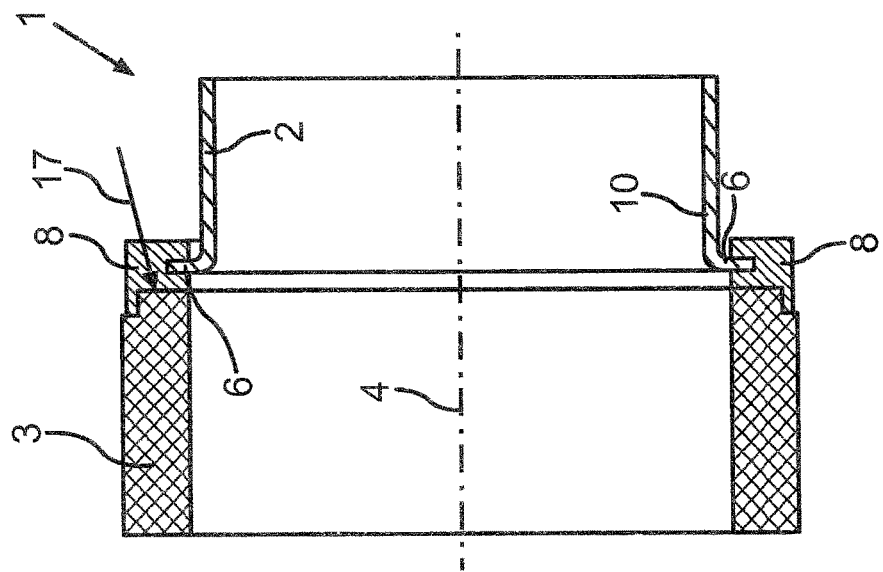
FIG. 4 shows, in a schematic illustration, the magnet unit as per FIG. 3, wherein a laser welding process will be discussed in more detail.

A magnet unit 1 illustrated in FIG. 1 is designed for use in a motor vehicle, in particular in a passenger motor vehicle. The magnet unit 1 is a constituent part of a sensor device which serves for detecting a torque and/or a steering angle of a steering shaft. Here, the magnet unit 1 is fastened to a shaft part of the steering shaft.

The magnet unit 1 comprises a carrier sleeve 2 formed from metal and comprises a magnet element 3 which is a permanent magnet composed of a plastics-bonded magnet material. The magnet element 3 is thus formed from a plastic filled with magnetic particles.

The magnet element 3 is of ring-shaped and bead-like form. The magnet element 3 has an axial face side 5 which points in an axial direction and thus in the direction of an axis of rotation 4 and by way of which the magnet element 3 is connected to the carrier sleeve 2.

The carrier sleeve 2 is likewise of bead-like and ring-shaped form and has an encircling radial flange 6 which extends perpendicular to the axis of rotation 4 and which points radially outward. The flange 6 forms an axial face side 7 of the carrier sleeve 2 and serves for the fastening of a plastics element 8 to the carrier sleeve 2. The plastics element 8 may be formed from a slightly elastic plastics material. The plastics element 8 is arranged radially above the flange 6, such that the flange 6 extends radially into the plastics element 8. In other words, the plastics element 8 engages around the flange 6 on both sides.

With regard to the fastening of the plastics element 8 to the flange 6, it may be provided that the plastics material of the plastics element 8 is injection-moulded onto the flange 6 or onto the axial face side 7 of the carrier sleeve 2. Here, positive locking with rotationally conjoining action is preferably produced, such that the plastics element 8 can be held rotationally conjointly on the carrier sleeve 2. For this purpose, it is for example possible for an outer edge 9 of the flange 6 to be of undulating and/or toothed form such that said outer edge does not have an ideal ring shape. Here, the undulating form also encompasses, for example, an elliptical shape. In addition or alternatively, passage openings may also be provided in the flange 6, through which passage openings the plastics material of the plastics element 8 extends.

Altogether, it is provided that the magnet element 3 and the carrier sleeve 2 are connected axially to one another by way of the respective axial face sides 5 and 7 so as to be arranged axially adjacent to one another. An arrangement of the magnet element 3 radially above the carrier sleeve 2 is however also possible.

The flange 6 projects radially outward from a bead-like main body 10 of the carrier sleeve 2. The plastics element 8 is designed, in terms of both internal diameter and external diameter, such that an axial face side 11 of the plastics element 8 and the axial face side 5 of the magnet element 3 are situated axially opposite one another. The internal diameter of the magnet element 3 may in principle also be smaller than the internal diameter of the main body 10 of the carrier sleeve 2.

In the exemplary embodiment as per FIG. 1, a stud 12 pointing in an axial direction or a rib is formed on the axial face side 11 of the ring-shaped plastics element 8. Said stud 12 may be an encircling stud. Alternatively, the stud 12 may be in the form of a ring segment or ring section. It is also possible for multiple such studs 12 to be provided which are arranged so as to be distributed in the circumferential direction.

Alternatively or in addition, a stud 12 of said type may also be formed on the axial face side 5 of the magnet element 3.

The stud 12 serves as an energy concentrator in order to facilitate the welding of the magnet element 3 and of the plastics element 8 to one another by way of ultrasound.

In the exemplary embodiment as per FIG. 1, the face side 5 of the magnet element 3 is cohesively connected to the face side 11 of the plastics element 8 by way of ultrasound welding. Here, as per the illustrated arrows 13, pressure is generated in an axial direction under the action of ultrasound, such that the magnet element 3, on the one hand, and the plastics element 8, on the other hand, melt at the contact surface and thus cohesively connect to one another. The material of the stud 12 is utilized for this purpose. The magnet unit 1 after the ultrasound welding process is shown in FIG. 2.

Figure 3:
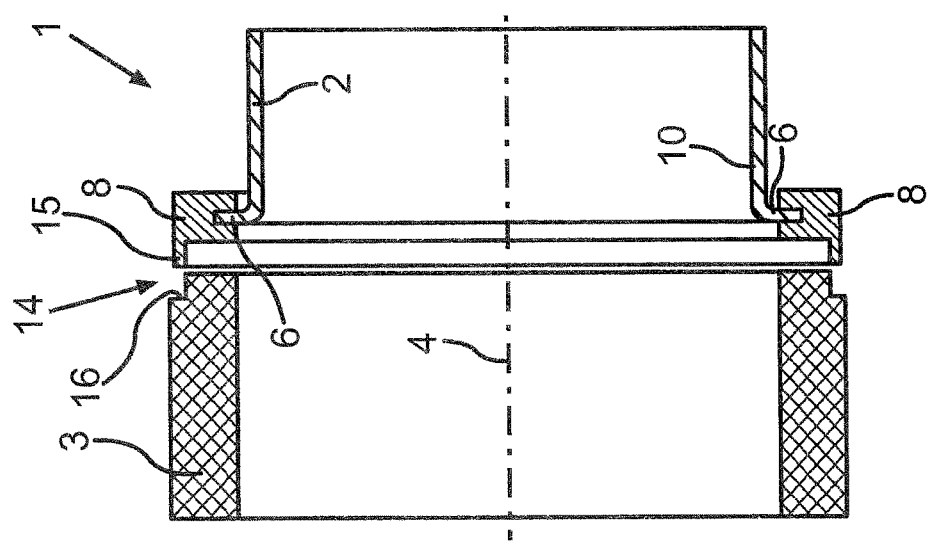
FIG. 3 shows, in a schematic illustration, a sectional view through a magnet unit as per a further embodiment of the invention.

With reference to FIG. 3, it may also be provided, in all of the embodiments, that the magnet unit 1 has a centring structure 14 which serves for the mutual orientation or positioning of the magnet element 3 and of the plastics element 8 relative to one another. A centring structure 14 of said type may, as illustrated in FIG. 3, have an axial projection 15 which can be placed in abutment with a corresponding step 16. In the exemplary embodiment, the axial projection 15 is formed on the plastics element 8, whereas the step 16 is provided on the magnet element 3. Said centring structure 14 is thus independent of the joining surfaces. Other centring aids are also possible, for example in the form of a pin and a corresponding bore.

A centring structure 14 of said type, as illustrated in FIG. 3, may also be provided in the embodiment as per FIGS. 1 and 2.

Alternatively or in addition to the ultrasound welding, laser welding of the magnet element 3 to the plastics element 8 may also be provided. Here, the plastics element 8 is formed from a plastics material which is transparent for the laser beam, such that the laser beam can penetrate through the plastics material of the plastics element 8. Such a connecting process is shown in FIG. 4. Here, the laser welding device is oriented and positioned such that the laser beam 17 that is generated can propagate through the transparent plastics element 8 in order to then be able to strike the axial face side 5 of the magnet element 3. The laser beam 17 is thus directed toward the contact surface and thus heats the magnet material of the magnet element 3 to the point of melting. The plastics material of the plastics element 8 likewise melts slightly. In the case of this method, the two parts do not move relative to one another during the joining process, such that precise positioning is possible.

In all of the embodiments, it may also be provided that the cohesive connection between the magnet element 3 and the plastics element 8 is realized fully circumferentially, and thus uniformly over the entire circumference. Also possible, however, is a segmented contact surface by way of individual ring segments. Here, the plastics element 8 may be connected to one of the components, magnet element 3 or carrier sleeve 2, over the entire circumference and to the other component by way of individual ring segments or projections. Alternatively, the intermediate element 8 may also be divided into individual ring segments, which are then connected to the carrier sleeve 2 and to the magnet element 3.

The invention claimed is:

1. A method for producing a magnet unit for a sensor device for detecting a measurement variable which is characteristic of a state of rotation of a steering shaft of a motor vehicle, by:
    providing a ring-shaped magnet element composed of a plastics-bonded magnet material;
    providing a carrier sleeve for a connection of the magnet unit to a shaft part of the steering shaft;
    connecting the magnet element to the carrier sleeve, wherein a plastics element is provided on the carrier sleeve, and connecting the magnet element comprises cohesively connecting the plastics element and the plastics-bonded magnet material of the magnet element to one another,
    wherein the cohesive connection is performed by at least one of laser welding and ultrasound welding,
    wherein an axial stud by way of which the cohesive connection is performed is formed on at least one of an axial face side of the plastics element and an axial face side of the magnet element, the axial stud being an energy concentrator that facilitates welding the magnet element and the plastics element to one another by providing material that melts to form the cohesive connection;
    injection-moulding a plastics material of the plastics element onto an axial face side of the carrier sleeve; and
    connecting the plastics element in positively locking fashion to the carrier sleeve.

2. The method according to claim 1, wherein the magnet element and the carrier sleeve are connected and axially adjacent to one another, by way of respective axial face sides, wherein the plastics element and an axial face side of the magnet element are cohesively connected to one another.

3. The method according to claim 1, wherein the plastics element is composed of a transparent plastics material.

4. The method according to claim 1, wherein, during a connection of the plastics element to the carrier sleeve, positive locking with rotationally conjoining action is produced between the plastics element and the carrier sleeve.

5. The method according to claim 4, wherein the positive locking with rotationally conjoining action is produced by way of openings in the carrier sleeve, into which openings the plastics element extends.

6. The method according to claim 4, wherein the positive locking with rotationally conjoining action is produced by way of at least one of an undulating and toothed outer edge of the carrier sleeve.

7. A magnet unit for a sensor device for detecting a measurement variable which is characteristic of a state of rotation of a steering shaft of a motor vehicle, comprising:
    a ring-shaped magnet element composed of a plastics-bonded magnet material; and
    a carrier sleeve which is connected to the magnet element and by way of which the magnet element is connected to a shaft part of the steering shaft,
    wherein a plastics element is arranged on the carrier sleeve, which is cohesively connected to the plastics-bonded magnet material of the magnet element by at least one of laser welding and ultrasound welding,
    wherein an axial stud by way of which the cohesive connection is performed is formed on at least one of an axial face side of the plastics element and an axial face side of the magnet element, the axial stud being an energy concentrator that facilitates welding the magnet element and the plastics element to one another by providing material that melts to form the cohesive connection,
    wherein a plastics material of the plastics element is injection-moulded onto an axial face side of the carrier sleeve, and
    wherein the plastics element is connected in positively locking fashion to the carrier sleeve.

8. A sensor device for detecting a measurement variable which is characteristic of a state of rotation of a steering shaft of a motor vehicle, comprising a magnet unit according to claim 7.

9. A motor vehicle having a sensor device according to claim 8.

\* \* \* \* \*